United States Patent
Cho (10) Patent No.: US 12,334,272 B2
(45) Date of Patent: Jun. 17, 2025

(54) MULTILAYER ELECTRONIC COMPONENT

(71) Applicant: SAMSUNG ELECTRO-MECHANICS CO., LTD., Suwon-si (KR)

(72) Inventor: Eun Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 278 days.

(21) Appl. No.: 18/132,104

(22) Filed: Apr. 7, 2023

(65) Prior Publication Data

US 2024/0203658 A1 Jun. 20, 2024

(30) Foreign Application Priority Data

Dec. 15, 2022 (KR) .................. 10-2022-0176037

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |
| *H01G 4/224* | (2006.01) |
| *H01G 4/232* | (2006.01) |

(52) U.S. Cl.
CPC .............. *H01G 4/30* (2013.01); *H01G 4/008* (2013.01); *H01G 4/012* (2013.01); *H01G 4/12* (2013.01); *H01G 4/224* (2013.01); *H01G 4/232* (2013.01)

(58) Field of Classification Search
CPC .......... H01G 4/30; H01G 4/008; H01G 4/012; H01G 4/12; H01G 4/224; H01G 4/232
See application file for complete search history.

(56) References Cited

U.S. PATENT DOCUMENTS

| | | |
|---|---|---|
| 2008/0242532 A1 | 10/2008 | Nishikawa |
| 2011/0069424 A1 | 3/2011 | Shiota et al. |
| 2014/0301015 A1* | 10/2014 | Kim .................. H01G 4/12 |
| | | 29/25.03 |

(Continued)

FOREIGN PATENT DOCUMENTS

| | | |
|---|---|---|
| JP | 2008-030973 A | 2/2008 |
| JP | 2008-239366 A | 10/2008 |

(Continued)

*Primary Examiner* — Michael P McFadden (74) *Attorney, Agent, or Firm* — Morgan Lewis & Bockius LLP (57) ABSTRACT

A multilayer electronic component includes a body including a capacitance forming portion including a dielectric layer and internal electrodes disposed in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction, side margin portions respectively disposed on the fifth and sixth surfaces, and external electrodes respectively disposed on the third and fourth surfaces. $0.436 < RM/RA < 0.920$ and $1.75 \times 10^{-4} < RA < 9.10 \times 10^{-4}$ are satisfied, in which RA is an intensity ratio of Na relative to Ti included in the capacitance forming portion and RM is an intensity ratio of Na relative to Ti included in one of the side margin portions.

22 Claims, 4 Drawing Sheets

(56) References Cited

U.S. PATENT DOCUMENTS

| | | | |
|---|---|---|---|
| 2016/0049248 A1 | 2/2016 | Imura et al. | |
| 2017/0018363 A1* | 1/2017 | Tanaka | H01G 4/30 |
| 2017/0243697 A1* | 8/2017 | Mizuno | H01G 4/1227 |
| 2018/0182555 A1* | 6/2018 | Kowase | H01G 4/30 |
| 2018/0261390 A1* | 9/2018 | Sakate | H01G 4/30 |
| 2019/0180936 A1 | 6/2019 | Cha et al. | |
| 2021/0074478 A1* | 3/2021 | Cha | C04B 35/47 |
| 2022/0277898 A1* | 9/2022 | Cha | H01G 4/30 |
| 2023/0053290 A1* | 2/2023 | Habu | H01G 4/1245 |

FOREIGN PATENT DOCUMENTS

| | | |
|---|---|---|
| JP | 2011-71162 A | 4/2011 |
| JP | 2011-213532 A | 10/2011 |
| JP | 2014-189465 A | 10/2014 |
| KR | 10-2019-0067683 A | 6/2019 |

\* cited by examiner

MULTILAYER ELECTRONIC COMPONENT

CROSS-REFERENCE TO RELATED APPLICATION

This application claims benefit of priority to Korean Patent Application No. 10-2022-0176037 filed on Dec. 15, 2022 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, is a chip-type capacitor mounted on the printed circuit boards of various types of electronic products, such as imaging devices including liquid crystal displays (LCDs) and plasma display panels (PDPs), computers, smartphones, cell phones, and the like, to allow electricity to be charged therein and discharged therefrom.

Such an MLCC may be used as a component of various electronic devices due to advantages thereof, such as compactness, guaranteed high capacitance, and ease of mounting. As various electronic devices, such as computers and mobile devices have been reduced in size and increased in power, demand for miniaturization and high capacitance of MLCCs have been increased.

To achieve miniaturization and high capacitance of multilayer ceramic capacitors, it is necessary to maximize an effective area of electrodes (increase an effective volume fraction necessary for capacitance implementation). In order to implement such a compact and high-capacitance multilayer ceramic capacitor as described above, in manufacturing the multilayer ceramic capacitor, a method of exposing internal electrodes in a width direction of a body to maximize an area of the internal electrodes in the width direction through design without a margin and separately attaching a ceramic green sheet for a side margin portion to a surface of the body to which the electrodes are exposed in the width direction before a stage of sintering the body and then sintering the body is applied.

Capacitance per unit volume of the capacitor may be improved by forming the side margin portion by separately attaching the ceramic green sheet for a side margin portion, but external moisture may penetrate through an interface between the body and the side margin portion or a plating solution may penetrate during a plating process, causing a problem in which the life of the chip may be shortened or a defect may occur, and therefore, development to solve these problems is required.

More specifically, in the process of forming the side margin portion, many pores may be formed at an interface in which the body and the side margin portion are in contact with each other to degrade reliability, and due to the pores, electric field concentration may occur, thereby lowering a breakdown voltage (BVD). In addition, as an interfacial junction occurs at the boundary between the body and the side margin portion, bonding strength may be lowered and thus moisture resistance reliability may deteriorate, or due to the pores, moisture resistance reliability may deteriorate due to a decrease in sintering density.

In addition, during the sintering process, internal electrodes and a dielectric layer having different melting points have different shrinkage rates. Due to the difference in shrinkage rates, it may be difficult to achieve various characteristics desired by the multilayer electronic component. In order to minimize this difference in shrinkage, it is necessary to realize densification and various characteristics at a low sintering temperature.

SUMMARY

An aspect of the present disclosure may provide a multilayer electronic component having excellent moisture resistance reliability.

An aspect of the present disclosure may also provide a multilayer electronic component having excellent dielectric density even during low-temperature sintering.

An aspect of the present disclosure may also provide a multilayer electronic component having excellent temperature characteristics.

According to an aspect of the present disclosure, a multilayer electronic component includes a body including a capacitance forming portion including a dielectric layer and internal electrodes alternately disposed with the dielectric layer in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction, side margin portions respectively disposed on the fifth and sixth surfaces, and external electrodes respectively disposed on the third and fourth surfaces. $0.436 < RM/RA < 0.920$ and $1.75 \times 10^{-4} < RA < 9.10 \times 10^{-4}$ are satisfied, in which RA is an intensity ratio of Na relative to Ti included in the capacitance forming portion and RM is an intensity ratio of Na relative to Ti included in the side margin portions.

According to an aspect of the present disclosure, a multilayer electronic component includes a body including a capacitance forming portion including a dielectric layer and internal electrodes alternately disposed with the dielectric layer in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction; side margin portions respectively disposed on the fifth and sixth surfaces; and external electrodes respectively disposed on the third and fourth surfaces. $RM < RA$ and $1.61 \times 10^{-4} < RM < 3.97 \times 10^{-4}$ are satisfied, in which RA is an intensity ratio of Na relative to Ti included in the capacitance forming portion and RM is an intensity ratio of Na relative to Ti included in one of the side margin portions.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

In the drawings, a first direction may be defined as a stacking direction or a thickness (T) direction, a second direction may be defined as a length (L) direction, and a third direction may be defined as a width (W) direction.

Multilayer Electronic Component

Figure 1:
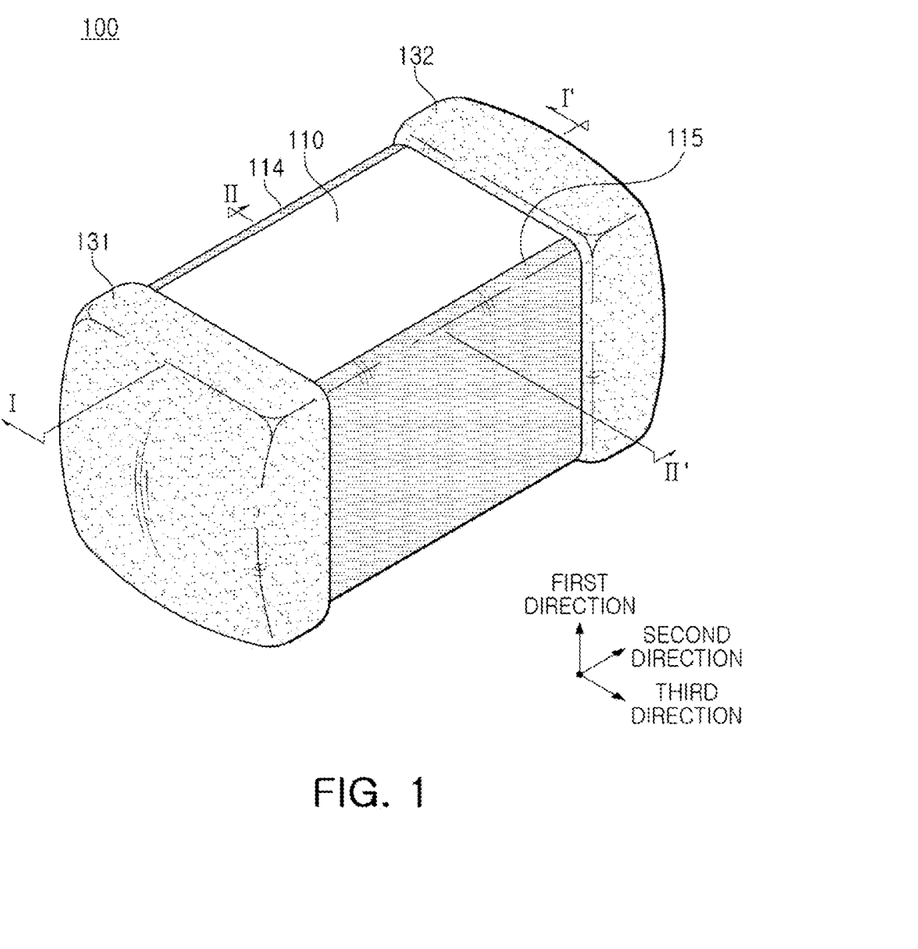
FIG. 1 is a perspective view schematically illustrating a multilayer electronic component according to an exemplary embodiment in the present disclosure.

FIG. 1 is a perspective view schematically illustrating a multilayer electronic component according to an exemplary embodiment in the present disclosure.

Figure 2:
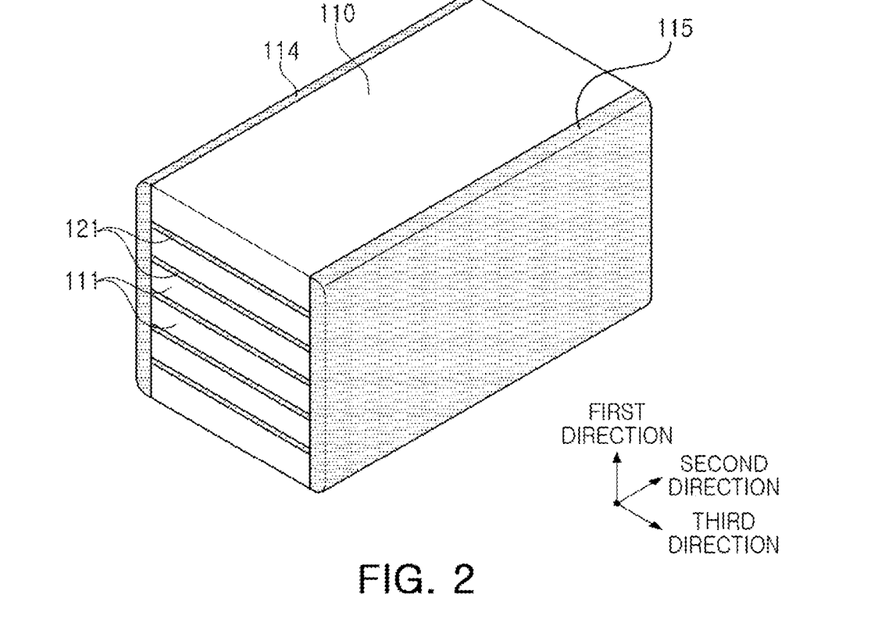
FIG. 2 is a perspective view of the multilayer electronic component of FIG. 1, excluding external electrodes.

FIG. 2 is a perspective view of the multilayer electronic component of FIG. 1, excluding external electrodes.

Figure 3:
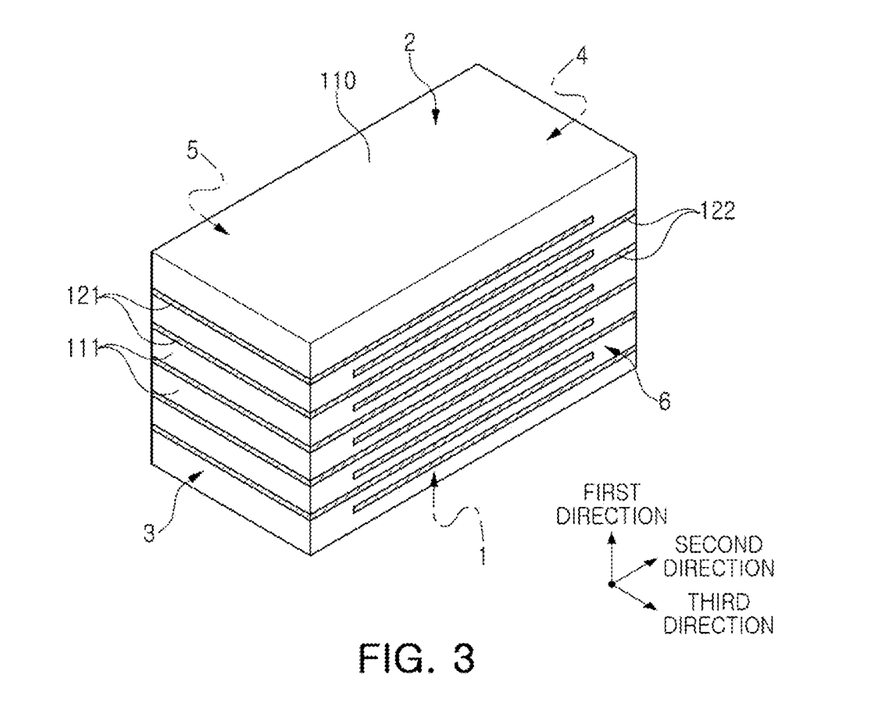
FIG. 3 is a perspective view of the multilayer electronic component of FIG. 1, excluding external electrodes and side margin portions.

FIG. 3 is a perspective view of the multilayer electronic component of FIG. 1, excluding external electrodes and side margin portions.

Figure 4:
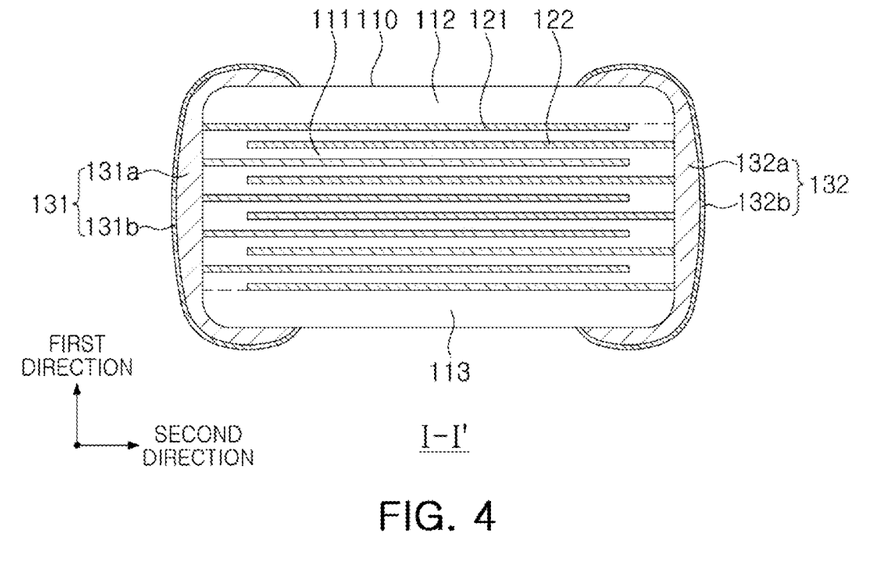
FIG. 4 is a cross-sectional view, taken along line I-I' of FIG. 1.

FIG. 4 is a cross-sectional view, taken along line I-I' of FIG. 1.

Figure 5:
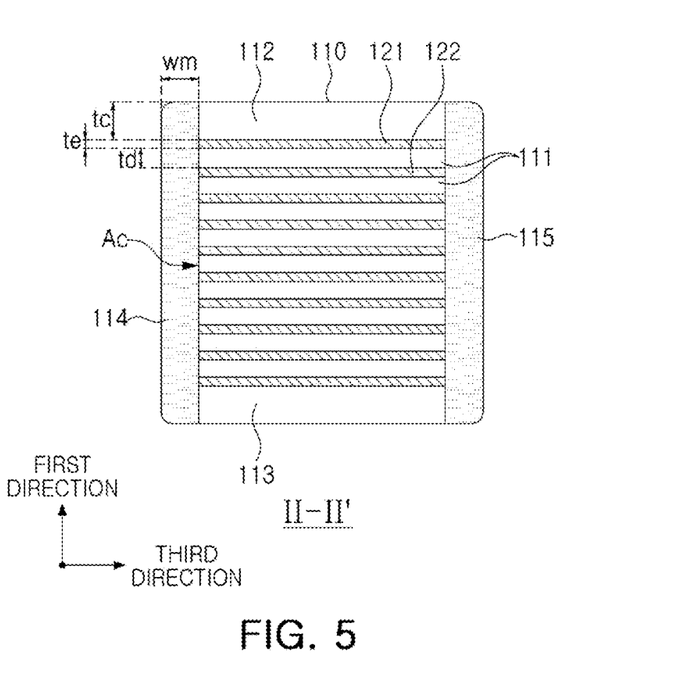
FIG. 5 is a cross-sectional view, taken along line II-II' of FIG. 1.

FIG. 5 is a cross-sectional view, taken along line II-II' of FIG. 1.

Hereinafter, a multilayer electronic component according to an exemplary y embodiment in the present disclosure will be described in detail with reference to FIGS. 1 to 5. However, although a multilayer ceramic capacitor is described as an example of a multilayer electronic component, the present disclosure may also be applied to various electronic products using a dielectric composition, such as inductors, piezoelectric elements, varistors, or thermistors.

A multilayer electronic component 100 according to an exemplary embodiment in the present disclosure may include a body 110 including a capacitance forming portion Ac including a dielectric layer 111 and internal electrodes 121 and 122 alternately disposed with the dielectric layer 111 in a first direction and including first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction, side margin portions 114 and 115 respectively disposed on the fifth and sixth surfaces 5 and 6, and external electrodes 131 and 132 respectively disposed on the third and fourth surfaces 3 and 4. 0.436<RM/RA<0.920 and $1.75 \times 10^{-4} < RA < 9.10 \times 10^{-4}$ may be satisfied, in which RA is an intensity ratio of Na relative to Ti included in the capacitance forming portion Ac and RM is an intensity ratio of Na relative to Ti included in the side margin portions 114 and 115.

In the body 110, the dielectric layers 111 and the internal electrodes 121 and 122 are alternately stacked.

More specifically, the body 110 may include a capacitance forming portion Ac disposed inside the body 110 and forming capacitance by including the first internal electrode 121 and the second internal electrode 122 alternately disposed to face each other with the dielectric layer 111 interposed therebetween.

Although the specific shape of the body 110 is not particularly limited, the body 110 may have a hexahedral shape or a shape similar thereto as illustrated. Due to the shrinkage of ceramic powder included in the body 110 during a sintering process, the body 110 may not have a perfectly straight hexahedral shape but may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3, and 4 and opposing each other in the third direction.

The dielectric layer 111 included in the body 110 is in a fired state, and adjacent dielectric layers 110 may be integrated such that boundaries therebetween may not be readily apparent using without a scanning electron microscope (SEM).

A raw material for forming the dielectric layer 110 is not limited as long as sufficient capacitance may be obtained. In general, a perovskite ($ABO_3$)-based material may be used, and for example, a barium titanate-based material, a lead composite perovskite-based material, or a strontium titanate-based material may be used. The barium titanate-based material may include $BaTiO_3$-based ceramic powder, and examples of the ceramic powder may include $BaTiO_3$ and $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1), or $Ba(Ti_{1-y}Zr_y)O_3$ (0<y<1) in which Ca, Zr, etc. are partially dissolved in $BaTiO_3$.

In addition, as a material for forming the dielectric layer 111, various ceramic additives, organic solvents, binders, dispersants, etc. may be added to powder of barium titanate ($BaTiO_3$) according to purposes of the present disclosure.

Meanwhile, in the present disclosure, the dielectric layer of the capacitance forming portion Ac may be defined as a first dielectric layer and may be defined as a first ceramic green sheet based on pre-sintering, and the dielectric layer included in the side margin portions 114 and 115 may be defined as a second dielectric layer and may be defined as a second ceramic green sheet based on pre-sintering.

A thickness td of the dielectric layer 111 may not be particularly limited.

However, in order to more easily achieve miniaturization and high capacitance of the multilayer electronic component, the thickness of the dielectric layer 111 may be 0.6 μm or less, more preferably, 0.4 μm or less.

Here, the thickness td of the dielectric layer 111 may refer to the thickness td of the dielectric layer 111 disposed between the first and second internal electrodes 121 and 122.

Meanwhile, the thickness td of the dielectric layer 111 may refer to a size of the dielectric layer 111 in the first direction. Also, the thickness td of the dielectric layer 111 may refer to an average thickness td of the dielectric layer 111 and may refer to an average size of the dielectric layer 111 in the first direction.

The average size of the dielectric layer 111 in the first direction may be measured by scanning an image of a cross-section of the body 110 in the first and second directions with an SEM having a magnification of 10,000. More specifically, the average size may be an average value obtained by measuring the sizes of one dielectric layer in the first direction at 30 equally spaced points in the second direction in the scanned image. The 30 points at equal intervals may be designated in the capacitance forming portion Ac. In addition, if the average value is measured by extending the measurement of the average value to 10 dielectric layers, the average size of the dielectric layers in the first direction may be more generalized.

The internal electrodes 121 and 122 may be alternately stacked with the dielectric layer 111.

The internal electrodes 121 and 122 may include a first internal electrode 121 and a second internal electrode 122, and the first and second internal electrodes 121 and 122 may be alternately disposed to face each other with the dielectric layer 111 constituting the body 110 interposed therebetween, and may be exposed to the third and fourth surfaces 3 and 4 of the body 110, respectively.

More specifically, the first internal electrode 121 may be spaced apart from the fourth surface 4 and may be exposed through (or be in contact with or extend from) the third surface 3, and the second internal electrode 122 may be spaced apart from the third surface 3 and may be exposed through (or be in contact with or extend from) the fourth surface 4. The first external electrode 131 may be disposed on the third surface 3 of the body 110 and connected to the first internal electrode 121, and the second external electrode 131 may be disposed on the fourth surface 4 of the body 110 and may be connected to the second internal electrode 122.

That is, the first internal electrode 121 may not be connected to the second external electrode 132 but be connected to the first external electrode 131, and the second internal electrode 122 may not be connected to the first external electrode 131 but be connected to the second external electrode 132. In this case, the first and second internal electrodes 121 and 122 may be electrically separated from each other by the dielectric layer 111 disposed therebetween.

Meanwhile, the body 110 may be formed by alternately stacking a ceramic green sheet on which the first internal electrode 121 is printed and a ceramic green sheet on which the second internal electrode 122 is printed and subsequently sintering the green sheets.

A material for forming the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti), and alloys thereof on a ceramic green sheet. A printing method of the conductive paste for internal electrodes may be a screen printing method or a gravure printing method, but the present disclosure is not limited thereto.

Meanwhile, a thickness te of the internal electrodes 121 and 122 may not be particularly limited.

However, in order to more easily achieve miniaturization and high capacitance of the multilayer electronic component, the thickness of the internal electrodes 121 and 122 may be 0.6 µm or less, more preferably, 0.4 µm or less.

Here, the thickness te of the internal electrodes 121 and 122 may refer to a size of the internal electrodes 121 and 122 in the first direction. In addition, the thickness te of the internal electrodes 121 and 122 may refer to an average thickness te of the internal electrodes 121 and 122, and may refer to an average size of the internal electrodes 121 and 122 in the first direction.

The average size of the internal electrodes 121 and 122 in the first direction may be measured by scanning an image of a cross-section of the body 110 in the first and second directions with an SEM having a magnification of 10,000. More specifically, the average size may be an average value obtained by measuring the sizes of one internal electrode 121 or 122 in the first direction at 30 equally spaced points in the second direction in the scanned image. The 30 equally spaced points may be designated in the capacitance forming portion Ac. In addition, when the average value is measured by extending the average value measurement to 10 internal electrodes 121 and 122, the average size of the internal electrodes 121 and 122 in the first direction may be more generalized.

Meanwhile, the body 110 may include cover portions 112 and 113 disposed on both end surfaces of the capacitance forming portion Ac in the first direction.

More specifically, the body 110 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by stacking a single dielectric layer 111 or two or more dielectric layers 111 on the upper and lower surfaces of the capacitance forming portion Ac in the first direction, respectively, and may serve to prevent damage to the internal electrodes 121 and 122 due to physical or chemical stress.

The upper cover portion 112 and the lower cover portion 113 may not include the internal electrodes 121 and 122 and may include the same material as that of the dielectric layer 111. That is, the upper cover portion 112 and the lower cover portion 113 may include a ceramic material, for example, a barium titanate ($BaTiO_3$)-based ceramic material.

Meanwhile, the thickness tc of the cover portions 112 and 113 may not be particularly limited.

However, in order to more easily achieve miniaturization and high capacitance of the multilayer electronic component, a thickness tc of the cover portions 112 and 113 may be 100 µm or less, preferably, 30 µm or less, and more preferably, 20 µm or less in micro-miniature products.

Here, the thickness tc of the cover portions 112 and 113 may refer to a size of the cover portions 112 and 113 in the first direction. In addition, the thickness tc of the cover portions 112 and 113 may refer to an average thickness tc of the cover portions 112 and 113, and may refer to an average size of the cover portions 112 and 113 in the first direction.

The average size of the cover portions 112 and 113 in the first direction may be measured by scanning an image of a cross-section of the body 110 in the first and second directions with an SEM having a magnification of 10,000. More specifically, the average size may be an average value obtained by measuring the thickness of one cover portion at 30 equally spaced points in the second direction in the scanned image. The 30 equally spaced points may be designated on the upper cover portion 112. In addition, if the average value is measured by extending the average value measurement to the lower cover portion 113, the average size of the cover portions 112 and 113 in the first direction may be more generalized.

Meanwhile, side margin portions 114 and 115 may be disposed on both end surfaces of the body 110 in the third direction.

More specifically, the side margin portions 114 and 115 may include a first side margin portion 114 disposed on the fifth surface 5 of the body 110 and a second side margin portion 115 disposed on the sixth surface 6 of the body 110. That is, the side margin portions 114 and 115 may be disposed on both end surfaces of the body 110 in the third direction.

As illustrated, the side margin portions 114 and 115 may refer to a region between both ends of the first and second internal electrodes 121 and 122 in the third direction and a boundary surface of the body 110 based on the cross-section of the body 110 in the first and third directions.

In other words, the side margin portions 114 and 115 may be connected to the internal electrodes 121 and 122 on the fifth and sixth surfaces 5 and 6 of the body.

The side margin portions 114 and 115 may basically serve to prevent damage to the internal electrodes 121 and 122 due to physical or chemical stress.

The side margin portions 114 and 115 may be formed by forming the internal electrodes 121 and 122 by applying conductive paste on the ceramic green sheet, except for a region in which the side margin portions 114 and 115 are to be formed, cutting so that the internal electrodes 121 and 122 are exposed to the fifth and sixth surfaces 5 and 6 of the body 110 after stacking to suppress a step difference due to the internal electrodes 121 and 122, and then stacking a single second ceramic green sheet or two or more second ceramic green sheets in the third direction on both end surfaces of the capacitance forming portion Ac in the third direction.

The second ceramic green sheet may include the same material as that of the first ceramic green sheet, and does not necessarily include Na-coated dielectric particles included in the first ceramic green sheet. In this case, the second ceramic green sheet may become the second dielectric layer through a sintering process.

In other words, the first side margin portion 114 and the second side margin portion 115 may not include the internal electrodes 121 and 122 and may include the same material as that of the dielectric layer 111. That is, the first side margin portion 114 and the second side margin portion 115 may include a ceramic material, for example, a barium titanate ($BaTiO_3$)-based ceramic material.

Meanwhile, a width wm of the first and second side margin portions 114 and 115 may not be particularly limited.

However, in order to more easily achieve miniaturization and high capacitance of the multilayer electronic component 100, the width wm of the first and second side margin portions 114 and 115 may be 100 μm or less, preferably, 30 μm or less, and more preferably, 20 μm or less in ultra-small products.

Here, the width wm of the side margin portions 114 and 115 may refer to a size of the side margin portions 114 and 115 in the third direction. Also, the width wm of the side margin portions 114 and 115 may refer to an average width wm of the side margin portions 114 and 115, and may refer to an average size of the side margin portions 114 and 115 in the third direction.

The average size of the side margins 114 and 115 in the third direction may be measured by scanning an image of a cross-section of the multilayer electronic component in the first and third directions with an SEM having a magnification of 10,000. More specifically, the average size may be an average value obtained by measuring the sizes of the side margin portion in the third direction at 30 equally spaced points in the first direction in the scanned image.

Although a structure in which the ceramic electronic component 100 includes two external electrodes 131 and 132 is described in an exemplary embodiment in the present disclosure, the number and shape of the external electrodes 131 and 132 may vary according to the shape of the internal electrodes 121 and 122 or other purposes.

The external electrodes 131 and 132 may be disposed on the body 110 and connected to the internal electrodes 121 and 122.

More specifically, the external electrodes 131 and 132 may be include first and second external electrodes 131 and 132 disposed on the third and fourth surfaces 3 and 4 of the body 110, respectively, and connected to the first and second internal electrodes 121 and 122, respectively. That is, the first external electrode 131 may be disposed on the third surface 3 of the body and connected to the first internal electrode 121, and the second external electrode 132 may be disposed on the fourth surface 4 of the body and may be connected to the second internal electrode 122.

The external electrodes 131 and 132 may be formed using any material having electrical conductivity, such as metal, and a specific material may be determined in consideration of electrical characteristics, structural stability, and the like, or may have a multilayer structure.

For example, the external electrodes 131 and 132 may include electrode layers 131a and 132a disposed on the body 110 and plating layers 131b and 132b disposed on the electrode layers 131a and 132a.

As a more specific example of the electrode layers 131a and 132a, the electrode layers 131a and 132a may be fired electrodes formed of conductive metal and glass or resin-based electrodes formed of conductive metal and resin.

In addition, the electrode layers 131a and 132a may have a form in which a plastic electrode and a resin-based electrode are sequentially formed on the body 110.

In addition, the electrode layers 131a and 132a may be formed by transferring a sheet including a conductive metal onto the body 110 or by transferring a sheet including a conductive metal onto a fired electrode.

The conductive metal used in the electrode layers 131a and 132a is not particularly limited as long as it is a material that may be electrically connected to the internal electrodes 121 and 122 to form capacitance, and examples thereof may include one or more selected from the group consisting of nickel (Ni) and copper (Cu), palladium (Pd), silver (Ag), gold (Au), platinum (Pt), tin (Sn), tungsten (W), titanium (Ti), and alloys thereof. The electrode layers 131a and 132a may be formed by applying a conductive paste prepared by adding glass frit to the conductive metal powder and then sintering it.

The plating layers 131b and 132b serve to improve mounting characteristics.

The type of the plating layers 131b and 132b is not particularly limited, and may be a single plating layer 131b or 132b including at least one of nickel (Ni), tin (Sn), palladium (Pd), and alloys thereof, or may be formed of a plurality of layers.

For a more specific example of the plating layers 131b and 132b, the plating layers 131b and 132b may be Ni plating layers or Sn plating layers, and may have a form in which a Ni plating layer and an Sn plating layer are sequentially formed on the electrode layers 131a and 132a or may have a form in which a Sn plating layer, a Ni plating layer, and a Sn plating layer are sequentially formed. In addition, the plating layers 131b and 132b may include a plurality of Ni plating layers and/or a plurality of Sn plating layers.

Meanwhile, in order to achieve miniaturization and high capacitance of multilayer ceramic capacitors, it is necessary to maximize an effective area of electrodes (increase an effective volume fraction necessary for capacitance implementation). In order to implement such a compact and high-capacitance multilayer ceramic capacitor as described above, in manufacturing a multilayer ceramic capacitor, a method of exposing internal electrodes in a width direction of a body to maximize an area of the internal electrodes in the width direction through design without a margin and separately attaching a ceramic green sheet for a side margin portion to a surface of the body to which the electrodes are exposed in the width direction before a stage of sintering the body and then sintering the body is applied.

Capacitance per unit volume of the capacitor may be improved by forming the side margin portion by separately attaching the ceramic green sheet for a side margin, but external moisture may penetrate through an interface between the body and the side margin portion or a plating solution may penetrate during a plating process, causing a problem in which the life of the chip may be shortened or a defect may occur, and therefore, development to solve these problems is required.

More specifically, in the process of forming the side margin portion, many pores may be formed at an interface in which the body and the side margin portion are in contact with each other to degrade reliability, and due to the pores, electric field concentration may occur, thereby lowering a breakdown voltage (BVD). In addition, as an interfacial junction occurs at the boundary between the body and the side margin portion, bonding strength may be lowered and thus moisture resistance reliability may deteriorate or interfacial delamination may occur, or due to the pores, moisture resistance reliability may deteriorate due to a decrease in sintering density.

In addition, during the sintering process, internal electrodes and a dielectric layer having different melting points have different shrinkage rates. Due to the difference in shrinkage rates, it may be difficult to achieve various characteristics desired by the multilayer electronic component. In order to minimize this difference in shrinkage, it is necessary to realize densification and various characteristics at a low sintering temperature.

According to the present disclosure, when the intensity ratio of Na relative to Ti included in the capacitance forming portion Ac is defined as RA and the intensity ratio of Na relative to Ti included in the side margin portions 114 and 115 is defined as RM, $0.436 < RM/RA < 0.920$ and $1.75 \times 10^{-4} < RA < 9.10 \times 10^{-4}$ are controlled to be satisfied, thereby improving moisture resistance reliability.

In addition, according to an exemplary embodiment in the present disclosure, additives added during manufacturing of dielectric particles may be coated on the surfaces of the dielectric particles in a hydrothermal manner, and as an additive advantageous to liquefaction, for example, Na, is uniformly distributed throughout the dielectric layer, thereby improving the density of the dielectric layer.

As the additive, for example, natrium (Na) (which may be defined as sodium in another nomenclature) may be used, and in the case of hydrothermal coating of an ionized Na additive on the surfaces of dielectric particles to form the dielectric layer 111 of the capacitance forming portion Ac, Na may diffuse into the side margin portions 114 and 115 disposed in the width direction of the body during a sintering process, and in this case, as a sintering temperature of the dielectric particles in the region of the side margin portions 114 and 115 in which Na is diffused is lowered, the density may be improved and the moisture resistance reliability may be improved.

According to an exemplary embodiment in the present disclosure, an X6S temperature change characteristic (temperature coefficient of capacitance (TCC)) as well as moisture resistance reliability, may be satisfied.

In general, the TCC temperature characteristic tends to deteriorate as the thickness of the dielectric layer 111 decreases. However, by satisfying the TCC temperature characteristic under the X6S condition, the reliability of the multilayer electronic component 100 may be improved.

In an exemplary embodiment in the present disclosure, when the intensity ratio of Na to Ti included in the capacitance forming portion Ac is defined as RA and the intensity ratio of Na to Ti included in the side margin portions 114 and 115 is defined as RM, $0.436 < RM/RA < 0.920$ and $1.75 \times 10^{-4} < RA < 9.10 \times 10^{-4}$ may be satisfied.

In the present disclosure, unless otherwise specified, the intensity ratio of Na to Ti may be included in the corresponding region or may refer to a ratio (Na/Ti) of (average) Na intensity to (average) Ti intensity measured by the described measurement method.

More specifically, the intensity ratio of Na to Ti included in the capacitance forming portion Ac may be measured using laser ablation-inductively coupled plasma (LA-ICP) analysis equipment. LA-ICP may analyze elements by irradiating a certain region of a surface of a sample with a laser beam to generate particles. In the present disclosure, a laser beam having a diameter of 100 μm was used, but is not particularly limited thereto.

More specifically, the intensity ratio of Na to Ti included in the capacitance forming portion Ac may be an intensity ratio obtained by measuring Na and Ti by polishing up to a ½ point in the second direction based on a cross-section of the body in the first and third directions and then irradiating a laser beam based on a central point of the cross-section. Alternatively, the intensity ratio of Na to Ti included in the capacitance forming portion Ac may be a value obtained by measuring an intensity ratio obtained by measuring Na and Ti by irradiating a laser beam in the first direction as described above, at two points spaced apart by a certain interval, for example, by about 100 μm, from a central point of the cross-section to both sides in the third direction and then averaging together with the Na/Ti intensity ratio including the central point. The region in which the Na/Ti intensity ratio is analyzed using LA-ICP may vary depending on the size or cross-sectional area of the multilayer electronic component.

At this time, each intensity unit of Ti and Na is a.u. (arbitrary unit) and may refer to relative intensity.

The intensity ratio of Na to Ti included in the side margin portions 114 and 115 may be measured by using LA-ICP analysis equipment as described above. More specifically, the ratio (Na/Ti) of the intensity of Na to the intensity of Ti included in the side margin portions 114 and 115 may be an intensity ratio obtained by measuring Na and Ti by polishing up to a partial point in the third direction up to a point in which the side margin portions 114 and 115 exist based on a cross-section of the multilayer electronic component in the first and second directions and then irradiating a laser beam in the first direction based on the central point of the cross-section and may be an average value including the intensity ratio obtained by measuring Na and Ti by irradiating a laser beam in the first direction as described above at two points spaced apart by about 100 μm from the central point of the cross-section to both sides in the second direction. The region in which the Na/Ti intensity ratio is analyzed by using LA-ICP may vary depending on the size of the multilayer electronic component or a cross-sectional area of the side margin portions and may be measured differently according to positions of the side margin portions 114 and 115 in the third direction to be measured.

Meanwhile, the ratio (RM/RA) of the RM of the side margin portions 114 and 115 to the RA of the capacitance forming portion Ac may satisfy $0.436<RM/RA<0.920$, more preferably, may satisfy $0.522 \leq RM/RA \leq 0.541$.

If the ratio (RM/RA) of the RM of the side margin portions 114 and 115 to the RA of the capacitance forming portion Ac is equal to or less than 0.436, it may be difficult to satisfy the X6S temperature characteristic, and if the ratio (RM/RA) is equal to or greater than 0.920, moisture resistance reliability may be inferior.

At this time, RA, the intensity ratio of Na to Ti included in the capacitance forming portion Ac, may satisfy $1.75 \times 10^{-4} < RA < 9.10 \times 10^{-4}$, and more preferably, satisfy $4.79 \times 10^{-4} \leq RA \leq 7.62 \times 10^{-4}$.

If the RA of the capacitance forming portion Ac is equal to or less than $1.75 \times 10^{-4}$, moisture resistance reliability may be inferior, and if the RA is equal to or greater than $9.10 \times 10^{-4}$, it may be difficult to satisfy the X6S temperature characteristic.

Meanwhile, RM, the intensity ratio of Na to Ti included in the side margin portions 114 and 115, may satisfy $1.61 \times 10^{-4} < RM < 3.97 \times 10^{-4}$, and more preferably, may satisfy $2.50 \times 10^{-4} \leq RM \leq 4.10 \times 10^{-4}$.

If the RM of the side margin portions 114 and 115 is equal to or less than $1.61 \times 10^{-4}$, the densification of the dielectric grains may not be sufficiently implemented and the moisture resistance reliability may be inferior, and if the RM is equal to or greater than $3.97 \times 10^{-4}$, it may be difficult to satisfy the X6S temperature characteristic.

Meanwhile, in an exemplary embodiment in the present disclosure, the ratio (RM/RA) of RM of the side margin portions 114 and 115 to RA of the capacitance forming portion Ac satisfies $0.436<RM/RA<0.920$, so that an average size of dielectric grains of the capacitance forming portion Ac may be smaller than an average size of the dielectric grains of the side margin portions 114 and 115. The dielectric grains of the capacitance forming portion Ac may refer to dielectric grains in the dielectric layer 111. As the average size of the dielectric grains of the capacitance forming portion Ac is small, the electric field concentration phenomenon may be suppressed, thereby improving the dielectric breakdown voltage (BDV).

In an exemplary embodiment in the present disclosure, when the intensity ratio of Na to Ti included in a region of ⅓ to ⅔ from an interface of the side margin portions 114 and 115 with the body 110 in an outer direction of the side margin portions 114 and 115 is defined as RMc, $2.50 \times 10^{-4} < RMc \leq 4.10 \times 10^{-4}$ may be satisfied. At this time, the ratio (RMc/Ra) of RMc of the side margin portions 114 and 115 to Ra of the capacitance forming portion Ac may satisfy $0.522 \leq RMc/Ra \leq 0.541$.

Here, the outer direction of the side margin portions 114 and 115 may refer to an outer direction rather than a direction toward the body 110 based on the third direction.

At this time, RMc, which is the intensity ratio of Na to Ti included in a region of ⅓ to ⅔ from an interface of the side margin portions 114 and 115 with the body 110 in an outer direction of the side margin portions 114 and 115, may be obtained as follows. In the cross-section of the multilayer electronic component 100 including the side margin portions 114 and 115 in the first and second directions, an average value of a value obtained by measuring an Na/Ti intensity ratio by including the central point in the cross-section in the first and second directions at a ⅓ point of the side margin portions 114 and 115 from the interface with the body 110 outwardly in the third direction, a value obtained by measuring a Na/Ti intensity ratio by including the central point in the cross-section in the first and second directions at a ⅔ point outwardly in the third direction, and a value obtained by measuring a Na/Ti intensity ratio by including the central point in the cross-section in the first and second directions at an arbitrary point, among ⅓ point to ⅔ point, outwardly in the third direction may be RMc.

More specifically, in an exemplary embodiment in the present disclosure, when a region up to the ⅓ point of the side margin portions 114 and 115 in an outer direction of the side margin portions 114 and 115 from the interface with the body 110 is defined as M1, a region up to the ⅔ point in the outer direction of the side margin portions 114 and 115 from M1 is defined as M2, and a region from M2 to an outer surface of the side margin portions 114 and 115 is defined as M3, the intensity ratio of Na to Ti included in each region may satisfy M3<M2<M1.

As described above, the intensity ratio of Na to Ti included in each region may be an average value by including a value obtained by measuring the Na/Ti intensity ratio by including the central point of the cross-section in the first and second directions at boundary points of each region in the side margin portions 114 and 115 and a value obtained by measuring the Na/Ti intensity ratio by including the central point of the cross-section in the first and second directions at an arbitrary point between the boundary points.

In addition, in an exemplary embodiment in the present disclosure, the intensity ratio of Na to Ti included in the side margin portions 114 and 115 may decrease gradually in an outer direction of the side margin portions 114 and 115 from the interface with the body 110. This may be a result of reduction in the diffused content of Na in a direction away from the capacitance forming portion Ac as Na is diffused to the first and second side margin portions 114 and 115 during the sintering process, or may be a result of implementation by controlling the Na content to vary according to positions of the second ceramic green sheet forming the side margin portions 114 and 115, but is not particularly limited thereto.

Meanwhile, in an exemplary embodiment in the present disclosure, the number of pores included in the side margin portions 114 and 115 may gradually decrease in a direction toward the interface with the body 110 from the outer surface of the side margin portions 114 and 115.

In addition, the size of the dielectric grains of the side margin portions 114 and 115 may gradually decrease from the outermost lateral surface of the side margin portions 114 and 115 toward the interface with the body 110.

When the Na content is high in the interface region of the side margin portions 114 and 115 with the body 110, grain growth of dielectric grains and pore formation may be suppressed and density in the corresponding region may be improved. As a result, penetration of external moisture into the capacitance forming portion Ac may be effectively suppressed, so that moisture resistance reliability may be improved.

Hereinafter, the present disclosure will be described in more detail through examples, but this is to help a detailed understanding of the present disclosure and the scope of the present disclosure is not limited by the examples.

Example

In order to evaluate X6S temperature characteristic and moisture resistance reliability according to the Na/Ti ratio included in the capacitance forming portion and the side margin portion, a sample chip was manufactured by adjusting the ratio of Na and Ti included in the first ceramic green sheet of the capacitance forming portion and the second ceramic green sheet of the side margin portion. A size of the sample chip was 0603 (length×width×thickness: 0.6 mm×0.3 mm×0.3 mm), and a size (width) of the side margin portion in the third direction was 12 μm.

Table 1 below shows measurement of the Na/Ti intensity ratio of the capacitance forming portion and the side margin portion of the sample chip when the amount (mol %) of the ionized Na additive added to the dielectric particles forming the dielectric layer of the capacitance forming portion is changed, and data obtained by evaluating the TCC temperature characteristic and moisture resistance reliability of each sample chip.

The Na/Ti intensity ratio of the capacitance forming portion and the side margin portion was measured by using a LA-ICP analysis equipment.

The Na/Ti intensity ratio of the capacitance forming portion was measured through the following method. First, the sample chip was polished by 300 μm in the second direction based on the cross-section in the first and third directions. Next, after setting a diameter of an LA-ICP laser beam to 100 μm, a laser beam was irradiated in the first direction by including a central point of the cross-section and points spaced apart by 100 μm to both sides of the central point in the third direction to measure Na and Ti to obtain a measurement value of the intensity ratio.

The Na/Ti intensity ratio of the side margin portion was measured through the following method. First, the first side margin portion attached to the sample chip was polished by 6 μm in the third direction based on the cross-section in the first and second directions. This may correspond to a ½ point of the side margin portion in the third direction. Then, after setting a diameter of the LA-ICP laser beam to 100 μm, the central point of the cross-section was irradiated with a laser beam in the first direction, and Na and Ti were measured to obtain an intensity ratio. The Na/Ti intensity ratio of the capacitance forming portion was described as RA, and the Na/Ti intensity ratio of the side margin portion was described as RM.

For the TCC temperature characteristic, it was determined whether the X6S characteristic was satisfied. The measurement evaluation conditions were conducted for 5 minutes under the conditions of 1 KHz and 0.12 Vrms, and a case in which a maximum capacitance change rate was within ±22% in a temperature range of −55° C. to +105° C. based on the capacitance at 25° C. was evaluated as O and a case in which the capacitance change rate was outside ±22% was evaluated as X.

Moisture resistance reliability evaluation was conducted for 12 hours under severe conditions of temperature condition of 85° C., relative humidity condition of 85%, voltage condition of 12.6 Vr, and among the entire 40 chips, a case in which a measured insulation resistance (IR) value was measured to below 10E+06, based on an initial insulation resistance ($IR_0$) 10E+09, was determined to be defective, and the number of defective chips out of 40 chips was described.

TABLE 1

| Test No. | Na mol % | LA-ICP | | | TCC | | | Moisture resistance reliability |
|---|---|---|---|---|---|---|---|---|
| | | RM | RA | RM/RA | −55° C. | +105° C. | X6S | |
| 1 | 0 | $1.61 \times 10^{-4}$ | $1.75 \times 10^{-4}$ | 0.920 | −21.44% | −21.47% | O | 15/40 |
| 2 | 0.1 | $2.50 \times 10^{-4}$ | $4.79 \times 10^{-4}$ | 0.522 | −20.29% | −21.7% | O | 1/40 |
| 3 | 0.15 | $3.31 \times 10^{-4}$ | $6.12 \times 10^{-4}$ | 0.541 | −21.11% | −21.62% | 0 | 0/40 |
| 4 | 0.2 | $4.10 \times 10^{-4}$ | $7.62 \times 10^{-4}$ | 0.538 | −20.36% | −21.87% | O | 0/40 |
| 5 | 0.25 | $3.97 \times 10^{-4}$ | $9.10 \times 10^{-4}$ | 0.436 | −22.25% | −22.21% | X | 0/40 |
| 6 | 0.5 | $3.55 \times 10^{-4}$ | $1.50 \times 10^{-3}$ | 0.237 | −22.64% | −24.43% | X | 1/40 |
| 7 | 0.75 | $4.22 \times 10^{-4}$ | $2.01 \times 10^{-3}$ | 0.210 | −23.27% | −25.90% | X | 4/40 |

Referring to Table 1, it can be seen that Test Nos. (hereinafter, Test Examples) 1 to 4 satisfy the X6S temperature characteristic but Test Examples 5 to 7 do not satisfy the X6S temperature characteristic. This may be considered as a result of the high Na content of the capacitance forming portion. In other words, it is considered that, as the RA ratio is high, sintering did not proceed or the grain growth of dielectric grains was excessively suppressed, whereby the X6S temperature characteristic may be evaluated as unsatisfactory.

In addition, in the case of Test Examples 2 to 7, it is confirmed that the moisture resistance reliability is excellent, but in the case of Test Example 1, the moisture resistance reliability is confirmed to be inferior. This may be seen as a result of the small content of Na included in the side margin portion. In other words, as the RM ratio is low, the number of pores increased and the density decreased. As a result, moisture resistance reliability may be evaluated to be inferior.

FIGS. 6A to 7B show images of an interface region between the capacitance forming portion and the second side margin portion of the sample chips of Test Example 1 and Test Example 4, respectively, based on the cross-section in the first and third directions at ½ point in the second direction, scanned by an SEM. Hereinafter, descriptions are given with reference to FIGS. 6A to 7B.

Figure 6A:
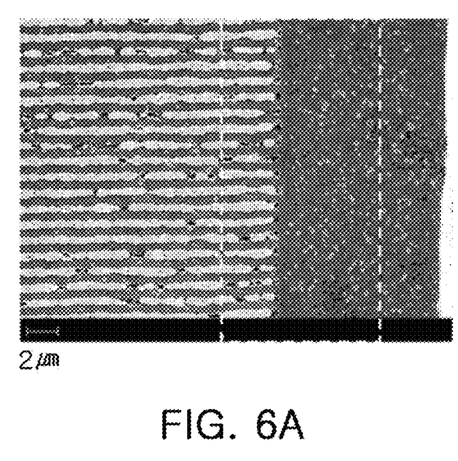
FIG. 6A is an image of an interface in which a capacitance forming portion and a side margin portion are in contact with each other in Comparative Example, scanned by a scanning electron microscope (SEM)
Figure 6B:
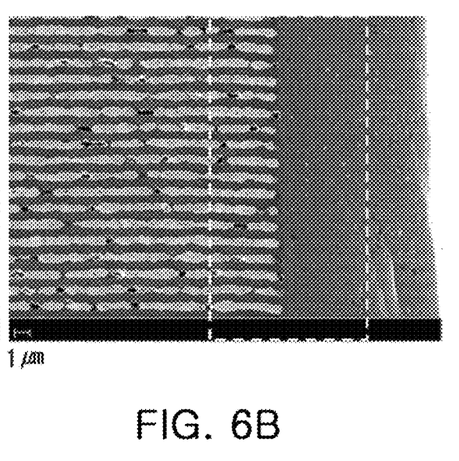
FIG. 6B is an image of an interface in which a capacitance forming portion and a side margin portion are in contact with each other in Example, scanned by an SEM.

More specifically, FIG. 6A is an image of an interface in which a capacitance forming portion and the second side margin portion are in contact with each other in Test Example 1, scanned by a scanning electron microscope (SEM), and FIG. 6B is an image of an interface in which a capacitance forming portion and the second side margin portion are in contact with each other in Test Example 4, scanned by an SEM.

It can be seen that, in the case of Test Example 1 in which Na was not added, many pores were observed in the interface region of the second side margin portion in contact with the capacitance forming portion, which is the region indicated by the dotted line, whereas in the case of Test Example 4 in which Na was added, pores were rarely observed in the interface region of the second side margin portion in contact with the capacitance forming portion, which is the region indicated by the dotted line.

Figure 7A:
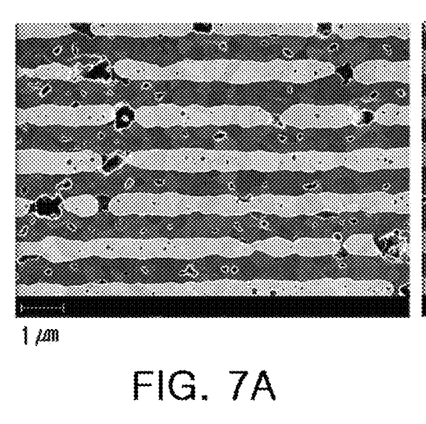
FIG. 7A is an image of a capacitance forming portion of Comparative Example scanned by an SEM.
Figure 7B:
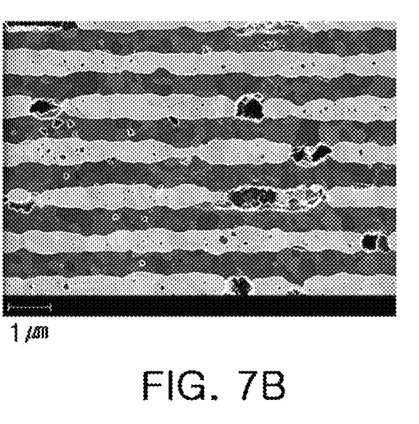
FIG. 7B is an image of a capacitance forming portion of Example, scanned by an SEM.

FIG. 7A is an image of the capacitance forming portion of Test Example 1 scanned by an SEM, and FIG. 7B is an image of the capacitance forming portion of Test Example 4 scanned by an SEM. Here, the bright contrast layer corresponds to the internal electrodes, and the dark contrast layer corresponds to the dielectric layer.

It can be seen that, in the case of Test Example 1 in which Na was not added, many pores were observed inside the dielectric layer, whereas, in the case of Test Example 4 in which Na was added, pores were rarely observed in the dielectric layer.

From the comparison between Test Example 1 and Test Example 4 through the drawings, it may be confirmed that the addition of Na reduces pores in the capacitance forming portion and the side margin portion and improves the density of the dielectric.

When the pores in the side margin portion are reduced and the density of the dielectric is improved, the moisture resistance reliability may be improved, and when the pores in the capacitance forming portion are reduced and the density of the dielectric is improved, target capacitance characteristics or electrical characteristics (X6S) may be satisfied.

One of the various effects of the present disclosure is to improve the moisture resistance reliability of multilayer electronic components.

One of the various effects of the present disclosure is to improve the density of the dielectric even at low temperature sintering.

One of the various effects of the present disclosure is to improve the temperature characteristics of multilayer electronic components.

Although the exemplary embodiments of the present disclosure have been described in detail above, the present disclosure is not limited by the exemplary embodiments described above and the accompanying drawings and is intended to be limited by the appended claims. Therefore, various forms of substitution, modification, and change may be possible by those skilled in the art within the scope of the technical spirit of the present disclosure described in the claims, which also falls within the scope of the present disclosure.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
    a body including a capacitance forming portion including a dielectric layer and internal electrodes alternately disposed with the dielectric layer in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
    side margin portions respectively disposed on the fifth and sixth surfaces; and
    external electrodes respectively disposed on the third and fourth surfaces,
    wherein $0.436 < RM/RA < 0.920$ and $1.75 \times 10^{-4} < RA < 9.10 \times 10^{-4}$ in which RA is an intensity ratio of Na relative to Ti included in the capacitance forming portion and RM is an intensity ratio of Na relative to Ti included in one of the side margin portions.

2. The multilayer electronic component of claim 1, wherein $0.522 \leq RM/RA \leq 0.541$ is satisfied.

3. The multilayer electronic component of claim 1, wherein $4.79 \times 10^{-4} \leq RA \leq 7.62 \times 10^{-4}$ is satisfied.

4. The multilayer electronic component of claim 1, wherein $1.61 \times 10^{-4} < RM < 3.97 \times 10^{-4}$ is satisfied.

5. The multilayer electronic component of claim 4, wherein $2.50 \times 10^{-4} \leq RM \leq 4.10 \times 10^{-4}$ is satisfied.

6. The multilayer electronic component of claim 1, wherein $2.50 \times 10^{-4} \leq RMc \leq 4.10 \times 10^{-4}$ in which RMc is the intensity ratio of Na relative to Ti included in a region of ⅓ to ⅔ of the one of the side margin portions in an outer direction of the one of the side margin portions from an interface with the body.

7. The multilayer electronic component of claim 6, wherein $0.522 \leq RMc/Ra \leq 0.541$ is satisfied.

8. The multilayer electronic component of claim 1, wherein
    the intensity ratio of Na relative to Ti included in each region satisfies M3<M2<M1, in which M1 is a region up to a ⅓ point of the one of the side margin portions in an outer direction of the one of the side margin portions from an interface with the body, M2 is a region up to a ⅔ point in the outer direction of the one of the side margin portions from M1, and M3 is a region from M2 to an outer surface of the one of the side margin portions.

9. The multilayer electronic component of claim 1, wherein the intensity ratio of Na to Ti included in the one of the side margin portions decreases toward an outer direction of the one of the side margin portions from an interface with the body.

10. The multilayer electronic component of claim 1, wherein a number of pores included in the one of the side margin portions decreases from an outer surface of the one of the side margin portions toward an interface with the body.

11. The multilayer electronic component of claim 1, wherein an average size of dielectric grains included in the capacitance forming portion is smaller than an average size of dielectric grains included in the one of the side margin portions.

12. The multilayer electronic component of claim 1, wherein a size of dielectric grains included in the one of the side margin portions decreases from an outer surface of the one of the side margin portions toward an interface with the body.

13. The multilayer electronic component of claim 1, wherein an average size of at least one of the internal electrodes in the first direction is 0.4 μm or less.

14. The multilayer electronic component of claim 1, wherein the dielectric layer includes a plurality of dielectric layers, and an average size of at least one of the plurality of dielectric layers in the first direction is 0.4 μm or less.

15. The multilayer electronic component of claim 1, wherein the side margin portions include a first side margin portion disposed on the fifth surface and a second side margin portion disposed on the sixth surface, and
an average size of each of the first and second side margin portions in the third direction is 20 μm or less.

16. The multilayer electronic component of claim 1, wherein the body further includes an upper cover portion disposed on an upper surface of the capacitance forming portion in the first direction and a lower cover portion disposed on a lower surface of the capacitance forming portion in the first direction, and
an average size of each of the upper and lower cover portions in the first direction is 20 μm or less.

17. A multilayer electronic component comprising:
a body including a capacitance forming portion including a dielectric layer and internal electrodes alternately disposed with the dielectric layer in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
side margin portions respectively disposed on the fifth and sixth surfaces; and
external electrodes respectively disposed on the third and fourth surfaces,
wherein $RM<RA$ and $1.61\times10^{-4}<RM<3.97\times10^{-4}$ in which RA is an intensity ratio of Na relative to Ti included in the capacitance forming portion and RM is an intensity ratio of Na relative to Ti included in one of the side margin portions.

18. The multilayer electronic component of claim 17, wherein $1.75\times10^{-4}<RA<9.10\times10^{-4}$ is satisfied.

19. The multilayer electronic component of claim 18, wherein $4.79\times10^{-4}\leq RA\leq7.62\times10^{-4}$ is satisfied.

20. The multilayer electronic component of claim 17, wherein $2.50\times10^{-4}\leq RM\leq4.10\times10^{-4}$ is satisfied.

21. The multilayer electronic component of claim 17, wherein a number of pores included in the one of the side margin portions decreases from an outer surface of the one of the side margin portions toward an interface with the body.

22. The multilayer electronic component of claim 17, wherein an average size of dielectric grains included in the capacitance forming portion is smaller than an average size of dielectric grains included in the one of the side margin portions.

* * * * *